(12) United States Patent
Dellal et al.

(10) Patent No.: US 12,078,236 B2
(45) Date of Patent: Sep. 3, 2024

(54) ELECTRIC DRIVE UNIT WITH GEAR SHAFT, ROTOR SHAFT AND THREE BEARINGS

(71) Applicant: Tesla, Inc., Austin, TX (US)

(72) Inventors: Benjamin Dellal, San Francisco, CA (US); Scott Michael Graves, Felton, CA (US); Luke Ottaway, Los Altos, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/341,603

(22) Filed: Jun. 26, 2023

(65) Prior Publication Data

US 2023/0341042 A1 Oct. 26, 2023

Related U.S. Application Data

(60) Continuation of application No. 17/060,681, filed on Oct. 1, 2020, now Pat. No. 11,686,384, which is a
(Continued)

(51) Int. Cl.
*H02K 7/00* (2006.01)
*B60K 1/00* (2006.01)
(Continued)

(52) U.S. Cl.
CPC ........... *F16H 57/0409* (2013.01); *B60K 1/00* (2013.01); *B60K 17/043* (2013.01);
(Continued)

(58) Field of Classification Search
CPC ............. F16H 57/0409; F16H 57/0402; F16H 57/0412; F16H 57/0423; F16H 57/0424;
(Continued)

(56) References Cited

U.S. PATENT DOCUMENTS 3,531,668 A * 9/1970 Cathey ................. G01R 31/343
310/58
4,269,295 A 5/1981 Kish
(Continued)

FOREIGN PATENT DOCUMENTS

CN 203831276 9/2014
DE 102008061275 9/2009
(Continued)

*Primary Examiner* — Maged M Almawri
(74) *Attorney, Agent, or Firm* — Knobbe, Martens, Olson & Bear, LLP (57) ABSTRACT

An electric drive unit and method of assembling the same is disclosed. The electric drive unit includes a rotor having a rotor shaft, and gear shaft, where the rotor shaft is inserted into the gear shaft. The gear shaft is supported by two bearings, while the rotor shaft supported directly at one end by a bearing and at the other by the gear shaft. A wave spring is also disclosed that provides an axial loading to the rotor shaft. Also disclosed is a balancing ring secured to an end of the rotor via a locknut. The balancing ring can be machined in order to balance the rotor. The rotor shaft can be connected to the gear shaft via a spline connection. The rotor shaft can bear against the gear shaft via a pilot journal and pilot bore defined on the rotor shaft and gear shaft respectively.

19 Claims, 8 Drawing Sheets

Related U.S. Application Data division of application No. 15/944,863, filed on Apr. 4, 2018, now Pat. No. 10,801,606.

(60) Provisional application No. 62/527,921, filed on Jun. 30, 2017.

(51) Int. Cl.

| | | |
|---|---|---|
| *B60K 17/04* | (2006.01) | |
| *F16C 25/08* | (2006.01) | |
| *F16H 57/04* | (2010.01) | |
| *H02K 1/20* | (2006.01) | |
| *H02K 5/20* | (2006.01) | |
| *H02K 7/04* | (2006.01) | |
| *H02K 7/08* | (2006.01) | |
| *H02K 7/116* | (2006.01) | |
| *H02K 9/193* | (2006.01) | |
| *H02K 15/16* | (2006.01) | |
| *B60K 1/02* | (2006.01) | |
| *F16H 57/02* | (2012.01) | |
| *F16H 57/032* | (2012.01) | |
| *F16H 57/037* | (2012.01) | |
| *H02K 9/19* | (2006.01) | |

(52) U.S. Cl.
CPC ....... *F16C 25/083* (2013.01); *F16H 57/0402* (2013.01); *F16H 57/0412* (2013.01); *F16H 57/0423* (2013.01); *F16H 57/0424* (2013.01); *F16H 57/0427* (2013.01); *F16H 57/0436* (2013.01); *F16H 57/0457* (2013.01); *F16H 57/046* (2013.01); *F16H 57/0471* (2013.01); *F16H 57/0482* (2013.01); *F16H 57/0483* (2013.01); *H02K 1/20* (2013.01); *H02K 5/20* (2013.01); *H02K 7/003* (2013.01); *H02K 7/04* (2013.01); *H02K 7/083* (2013.01); *H02K 7/116* (2013.01); *H02K 9/193* (2013.01); *H02K 15/165* (2013.01); *B60K 2001/001* (2013.01); *B60K 1/02* (2013.01); *B60K 17/04* (2013.01); *B60Y 2200/91* (2013.01); *B60Y 2306/03* (2013.01); *B60Y 2306/05* (2013.01); *B60Y 2410/1022* (2013.01); *F16C 2326/06* (2013.01); *F16H 2057/02034* (2013.01); *F16H 2057/0325* (2013.01); *F16H 57/037* (2013.01); *H02K 7/006* (2013.01); *H02K 9/19* (2013.01)

(58) Field of Classification Search
CPC ............. F16H 57/0427; F16H 57/0436; F16H 57/0457; F16H 57/046; F16H 57/0471; F16H 57/0482; F16H 57/0483; F16H 57/037; F16H 2057/02034; F16H 2057/0325; B60K 1/00; B60K 17/043; B60K 17/04; B60K 2001/0014; F16C 25/083; F16C 2326/06; H02K 1/20; H02K 7/003; H02K 7/04; H02K 7/083; H02K 7/116; H02K 7/007; H02K 7/006; H02K 9/193; H02K 9/19; H02K 15/165; B60Y 2200/91; B60Y 2306/03; B60Y 2410/1022
USPC ........................................ 310/75 R, 75 D, 83
See application file for complete search history.

(56) References Cited

U.S. PATENT DOCUMENTS

| | | | |
|---|---|---|---|
| 4,607,180 A * | 8/1986 | Stoody | F16H 25/2018 310/112 |
| 5,251,725 A | 10/1993 | Barrett, Jr. | |
| 5,899,574 A | 5/1999 | Chujo | |
| 6,123,338 A | 9/2000 | Edelmann | |
| 6,158,898 A | 12/2000 | Jeng | |
| 6,507,134 B1 | 1/2003 | Severien | |
| 6,938,731 B2 | 9/2005 | Slesinski | |
| 7,374,507 B2 | 5/2008 | Corless | |
| 8,950,531 B2 * | 2/2015 | Urabe | B60B 27/065 180/205.1 |
| 9,052,009 B2 | 6/2015 | Barillot | |
| 9,810,311 B1 | 11/2017 | Zhang | |
| 9,816,602 B2 * | 11/2017 | Beisel | F16H 57/0493 |
| 9,822,869 B1 | 11/2017 | Carr | |
| 10,208,848 B2 | 2/2019 | Hotait | |
| 10,510,195 B2 | 12/2019 | Patil et al. | |
| 10,781,909 B2 | 9/2020 | Graves et al. | |
| 10,801,606 B2 | 10/2020 | Dellal | |
| 10,808,827 B2 | 10/2020 | Graves | |
| 11,125,315 B2 | 9/2021 | Graves et al. | |
| 11,137,060 B2 | 10/2021 | Dellal | |
| 2004/0130224 A1* | 7/2004 | Mogi | H02K 5/203 310/75 R |
| 2004/0134693 A1* | 7/2004 | Yamagishi | H02K 7/116 180/65.1 |
| 2005/0045393 A1* | 3/2005 | Mizutani | B60K 17/046 180/65.51 |
| 2006/0062505 A1 | 3/2006 | Hoefs | |
| 2007/0200439 A1 | 8/2007 | Nagahashi et al. | |
| 2009/0102298 A1* | 4/2009 | Savant | H02K 5/203 310/52 |
| 2009/0127954 A1* | 5/2009 | Mogi | F16H 57/0476 310/90 |
| 2009/0212649 A1 | 8/2009 | Kingman et al. | |
| 2010/0187954 A1* | 7/2010 | Kendall | B60K 7/0007 310/67 R |
| 2011/0234029 A1 | 9/2011 | Pal | |
| 2012/0096968 A1 | 4/2012 | Kawamoto | |
| 2013/0293040 A1 | 11/2013 | Chamberlin | |
| 2014/0027238 A1 | 1/2014 | Schlaufman | |
| 2014/0056733 A1* | 2/2014 | Ojima | F04C 29/0085 417/321 |
| 2014/0147306 A1* | 5/2014 | Yamashita | F01D 5/027 417/410.1 |
| 2014/0284183 A1* | 9/2014 | Wolters | B65G 39/09 198/788 |
| 2014/0364263 A1* | 12/2014 | Tokunaga | F16C 35/063 310/90 |
| 2015/0082929 A1* | 3/2015 | Isomura | F16H 3/727 74/331 |
| 2016/0294231 A1 | 10/2016 | Andres et al. | |
| 2016/0311306 A1* | 10/2016 | Sugiyama | F16H 37/0833 |
| 2017/0096058 A1* | 4/2017 | Kanada | F16H 3/728 |
| 2018/0259060 A1 | 9/2018 | Poster | |
| 2018/0278126 A1* | 9/2018 | Goldstein | H02K 9/193 |
| 2019/0006923 A1 | 1/2019 | Dellal et al. | |
| 2019/0267869 A1* | 8/2019 | Soma | H02K 11/21 |
| 2021/0018087 A1 | 1/2021 | Dellal | |
| 2022/0003306 A1 | 1/2022 | Graves | |

FOREIGN PATENT DOCUMENTS

| | | |
|---|---|---|
| GB | 162552 | 5/1921 |
| GB | 1426352 | 2/1976 |
| WO | WO 16/04670 | 12/2016 |

* cited by examiner

ELECTRIC DRIVE UNIT WITH GEAR SHAFT, ROTOR SHAFT AND THREE BEARINGS

CROSS-REFERENCE TO RELATED APPLICATION

The present U.S. Utility Patent Applications is a continuation application of U.S. Utility patent application Ser. No. 17/060,681, filed Oct. 1, 2020, which is a divisional application of U.S. Utility patent application Ser. No. 15/944,863, filed Apr. 4, 2018, now U.S. Pat. No. 10,801,606 issued on Oct. 13, 2020, which claims priority pursuant to 35 U.S.C. § 119(e) to U.S. Provisional Application No. 62/527,921, entitled "ELECTRIC DRIVE UNIT", filed Jun. 30, 2017, which are hereby incorporated herein by reference in their entirety and made part of the present U.S. Utility Patent Applications for all purposes.

The present application is related to U.S. Utility patent application Ser. No. 15/637,313, entitled "SYSTEM AND METHOD FOR MONITORING STRESS CYCLES," filed Jun. 29, 2017, which is incorporated by reference in its entirety.

BACKGROUND

Technical Field

The present invention relates to electric drive units, and more particularly to the alignment of bearings and shafts therein, and the securing and balancing thereof.

Description of the Related Art

In the art of electric drive units and, more generally, power transmission devices, bearing and shaft misalignment can negatively impact the efficiency, performance, and life span of the system. With respect to a loss in efficiency, this translates to loss of vehicle range when such electric drive units or power transmission devices are used in a vehicle, or an increase in system weight and cost, for example if one were to increase the number of batteries in an electric vehicle to achieve a desired range. In addition, bearing and gear noise resulting from bearing and shaft misalignment can negatively impact the user experience. An unbalanced electric drive unit can also negatively impact the efficiency, performance and life span of the system. Vibrations resulting from misaligned shafts and unbalanced rotors can also negatively impact the system and user experience.

A need exists, therefore, for improved apparatuses and approaches for bearing and shaft alignment, as well as the balancing of, electric drive units and other power transmission devices.

SUMMARY OF THE INVENTION

The present disclosure presents methods and structures that help overcome the difficulties of aligning bearings and shafts, as well as balancing rotors in electric drive units.

According to one aspect of the present disclosure, there is provided an apparatus that includes a rotor shaft, a gear shaft, a first bearing, a second bearing, and a third bearing, wherein the rotor shaft defines a first end and a second end, wherein the rotor shaft defines a first region from the first end to a first shoulder, wherein the rotor shaft defines a second region from the second end to a second shoulder, wherein the first bearing supports the rotor shaft, in the second region and adjacent to the second shoulder, wherein the gear shaft defines a third end and a fourth end, wherein the gear shaft defines a third region from the third end to a third shoulder, wherein the gear shaft defines a fourth region from the fourth end to a fourth shoulder, wherein the first region of the rotor shaft is inserted into the fourth end of the gear shaft, wherein the fourth end of the gear shaft is adjacent to the first shoulder, wherein the second bearing supports the gear shaft in the third region and adjacent to the third shoulder, wherein the third bearing supports the gear shaft in the fourth region and adjacent to the fourth shoulder, and wherein only the first bearing directly supports the rotor shaft.

In some embodiments the apparatus according to the above-described aspect of the present disclosure or any other aspects thereof, a number of optional operations and features may be employed. One optional feature is the rotor shaft defines a fifth region within the first region defining a first spline connector and wherein the gear shaft defines a sixth region within the gear shaft defining a second spline connector, and wherein the fifth region and sixth region together form a spline connection. Another optional feature is the wherein third bearing is further situated in the first region relative to the rotor shaft. Another optional feature is wherein the rotor shaft further defines a pilot journal in the first region, wherein the gear shaft defines a pilot bore in the fourth region and wherein the pilot journal and pilot bore bear against each other. Another optional feature is wherein the gear shaft further includes a gear. Another optional feature is a wave spring adjacent to the first bearing and on an opposite side of the first bearing from the second shoulder. Another optional feature is the apparatus includes a stack of laminated discs defining a first rotor end, a second rotor end and an opening therethrough and a balancing ring, wherein the rotor shaft extends through the opening and is connected to the stack of laminated discs, wherein a first portion of the rotor shaft extends outward from the first rotor end beyond the stack of laminated discs, wherein a second portion of the rotor shaft extends outward from the second rotor end beyond the stack of laminated discs, wherein the first portion of the rotor shaft further extends through the balancing ring, and wherein the balancing ring is machined to balance the rotor. Another optional feature is wherein the rotor shaft is connected to the stack of laminated discs with an interference fit. Another optional feature is a lock nut, wherein the balancing ring is interposed between the lock nut and first rotor end. Another optional feature is wherein the first portion of the rotor shaft defines a threaded region, and wherein the lock nut is secured to the rotor shaft via the threaded region. Another optional feature is wherein the balancing ring is machined after the lock nut is secured to the first portion of the rotor shaft. Another optional feature is wherein the lock nut defines first channels in a first outer edge of the lock nut. Another optional feature is wherein the second portion of the rotor shaft defines a shoulder having second channels in a second outer edge of the shoulder.

According to one aspect of the present disclosure, there is provided a method of assembling an electric drive unit including a rotor shaft, a gear shaft, a first bearing, a second bearing, and a third bearing, wherein the rotor shaft defines a first end and a second end, wherein the rotor shaft defines a first region from the first end to a first shoulder, wherein the rotor shaft defines a second region from the second end to a second shoulder, wherein the gear shaft defines a third end and a fourth end, wherein the gear shaft defines a third region from the third end to a third shoulder, and wherein the gear shaft defines a fourth region from the fourth end to a fourth shoulder, the method including positioning the second region of the rotor shaft into the first bearing such that the first bearing is adjacent the second shoulder, positioning the first region of the rotor shaft into the fourth end of the gear shaft such that the fourth end of the gear shaft is adjacent the first shoulder, positioning the third region of the gear shaft into the second bearing such that the second bearing is adjacent the third shoulder, positioning the fourth region of the gear shaft into the third bearing such that the third bearing is adjacent the fourth shoulder, and wherein only the first bearing directly supports the rotor shaft.

In some embodiments the method according to the above-described aspect of the present disclosure or any other aspects thereof, a number of optional operations and features may be employed. One optional feature is wherein the rotor shaft defines a fifth region within the first region defining a first spline connector and wherein the gear shaft defines a sixth region within the gear shaft defining a second spline connector, and wherein the step of positioning the first region of the rotor shaft into the fourth end of the gear shaft includes positioning the fifth region into the sixth region and forming a spline connection. Another optional feature is disposing a wave spring on an opposite side of the first bearing from the first shoulder. Another optional feature is a stack of laminated discs defining a first rotor end, a second rotor end and an opening therethrough, and a balancing ring, wherein the rotor shaft extends through the opening and is connected to the stack of laminated discs, wherein a first portion of the rotor shaft extends outward from the first rotor end beyond the stack of laminated discs, and wherein a second portion of the rotor shaft extends outward from the second rotor end beyond the stack of laminated discs, and further including positioning the first portion of the rotor shaft through the balancing ring. Another optional feature is machining the balancing ring. Another optional feature is securing the balancing ring to the first rotor end using a lock nut. Another optional feature is the second portion of the rotor shaft defines a plurality of channels in an outer edge thereof, and attaching the lock nut to the rotor shaft using the plurality of channels.

DETAILED DESCRIPTION OF THE PREFERRED EMBODIMENT

Figure 1A:
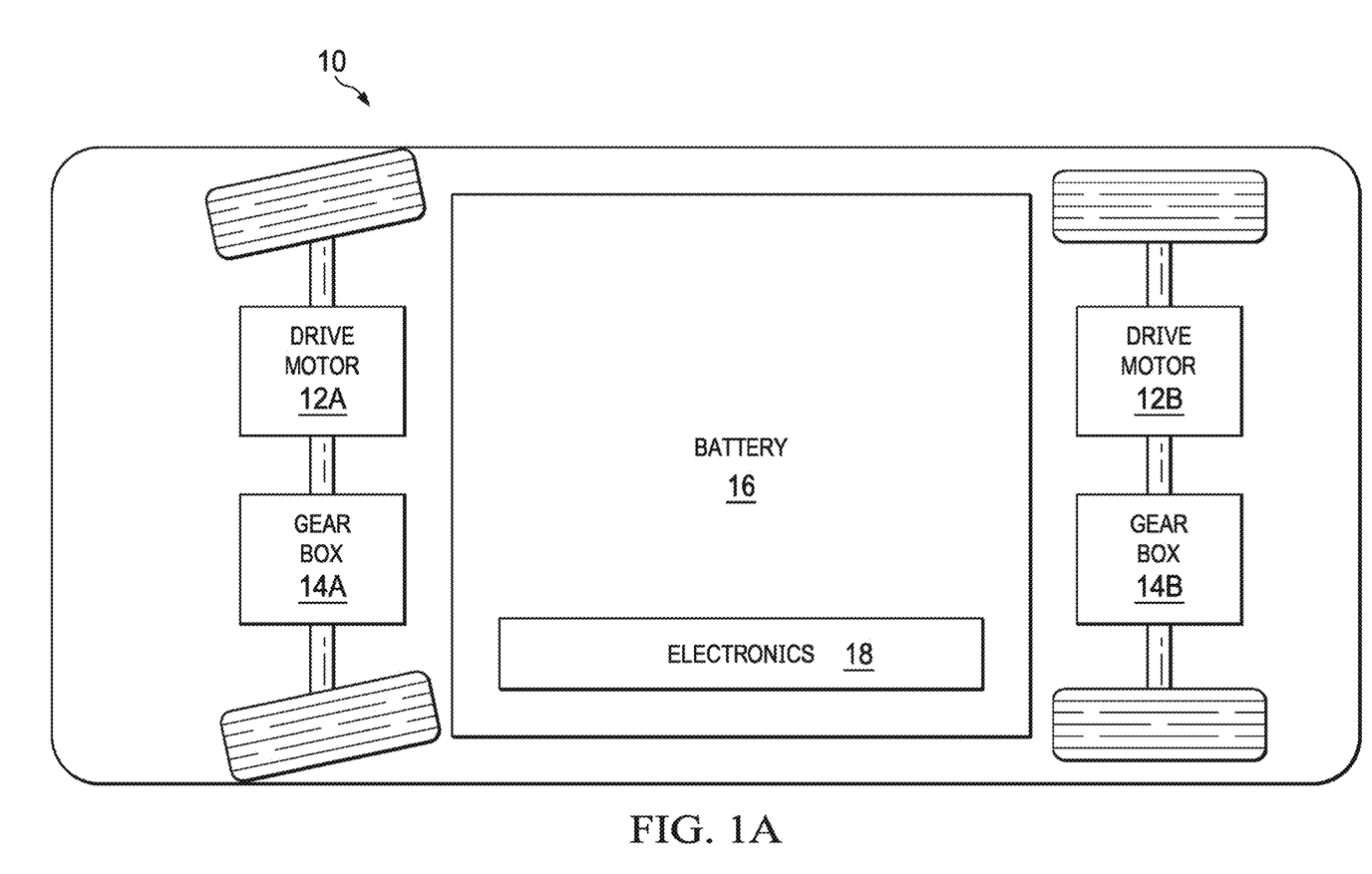
FIG. 1A illustrates the basic components of a battery powered electric vehicle.

FIG. 1A illustrates the basic components of a battery powered electric vehicle (electric vehicle) 10. The electric vehicle 10 includes at least one drive motor (traction motor) 12A and/or 12B, at least one gear box 14A and/or 14B coupled to a corresponding drive motor 12A and/or 12B, a battery 16 and electronics 18 (including drive motor electronics). Generally, the battery 16 provides electricity to the electronics 18 of the electric vehicle 10 and to propel the electric vehicle 10 using the drive motor 12A and/or 12B. The electric vehicle 10 includes a large number of other components that are not described herein but known to one or ordinary skill. While the construct of the electric vehicle 10 of FIG. 1A is shown to have four wheels, differing electric vehicles may have fewer or more than four wheels. Further, differing types of electric vehicles 10 may incorporate the inventive concepts described herein, including motor cycles, aircraft, trucks, boats, train engines, among other types of vehicles.

Various operational issues with the electric vehicle 10 are described herein in conjunction with various embodiments. One of these operational issues relates aligning bearings used in drive motor 12A and/or 12B and gear box 14A and/or 14B. Another of these operational issues relates to securing and balancing a rotor of drive motor 12A and/or 12B. Subsequent description herein may relate back to the components of this FIG. 1A. Common numbering may be used to refer to components identified in further FIGs. described herein.

Figure 1B:
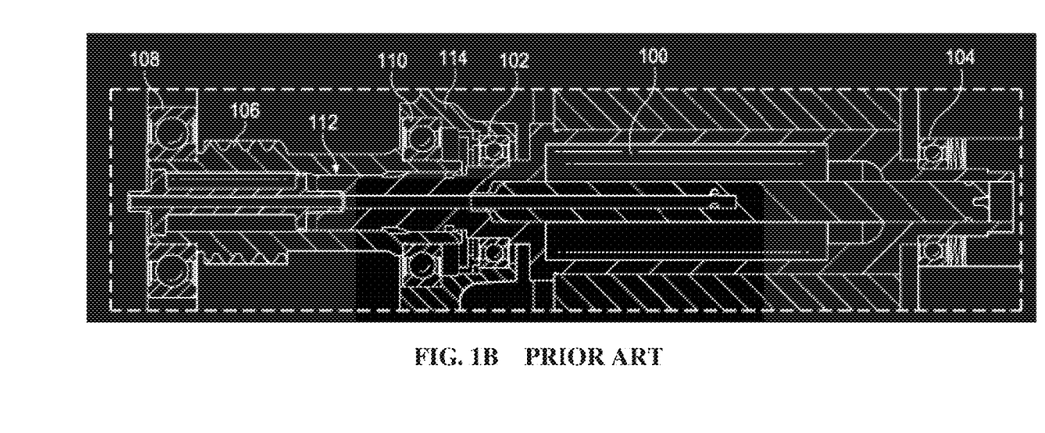
FIG. 1B illustrates a side sectional view of a portion of an electric drive unit.

FIG. 1B illustrates a side sectional view of a portion of an electric drive unit known in the art. As shown therein, rotor shaft 100 is supported by bearings 102 and 104, while gear shaft 106 is supported by bearings 108 and 110. One problem with such an arrangement is that of aligning bearings 102 and 104 with bearings 108 and 110 (and rotor shaft 100 with gear shaft 106). This problem can be significant as misalignment of rotor shaft 100 and gear shaft 106 leads to wear on spline connection 112 which results in inefficiencies and noise. Additional structure 114 is also necessitated by such an arrangement in order to house bearings 110 and I 02, which structure adds additional weight and material to the overall system.

Figure 2:
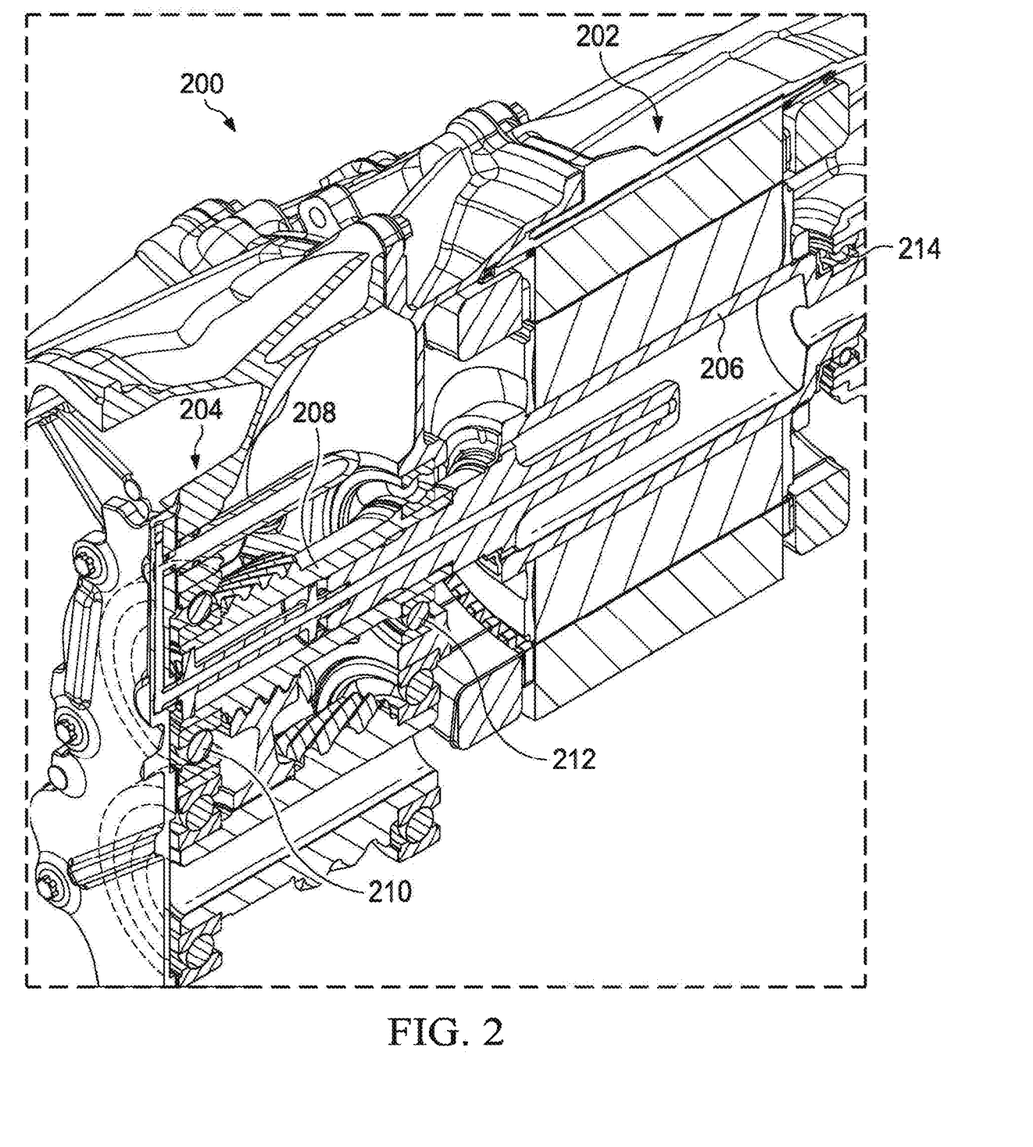
FIG. 2 illustrates a perspective side sectional view of a portion of an electric drive unit according to a disclosed embodiment.

FIG. 2 illustrates perspective side sectional view of a portion of an electric drive unit 200 according to a disclosed embodiment. As shown therein, drive unit 200 includes motor portion 202 (which could be drive motor 12A or 12B in FIG. 1A) and gear box portion 204 (which could be gear box 14A or 14B in FIG. 1A). Also shown therein is rotor shaft 206, gear shaft 208 and bearings 210, 212 and 214. A more detailed explanation of this arrangement is provided below having reference to FIGS. 3 and 4A, 4B and 4C.

Figure 3:
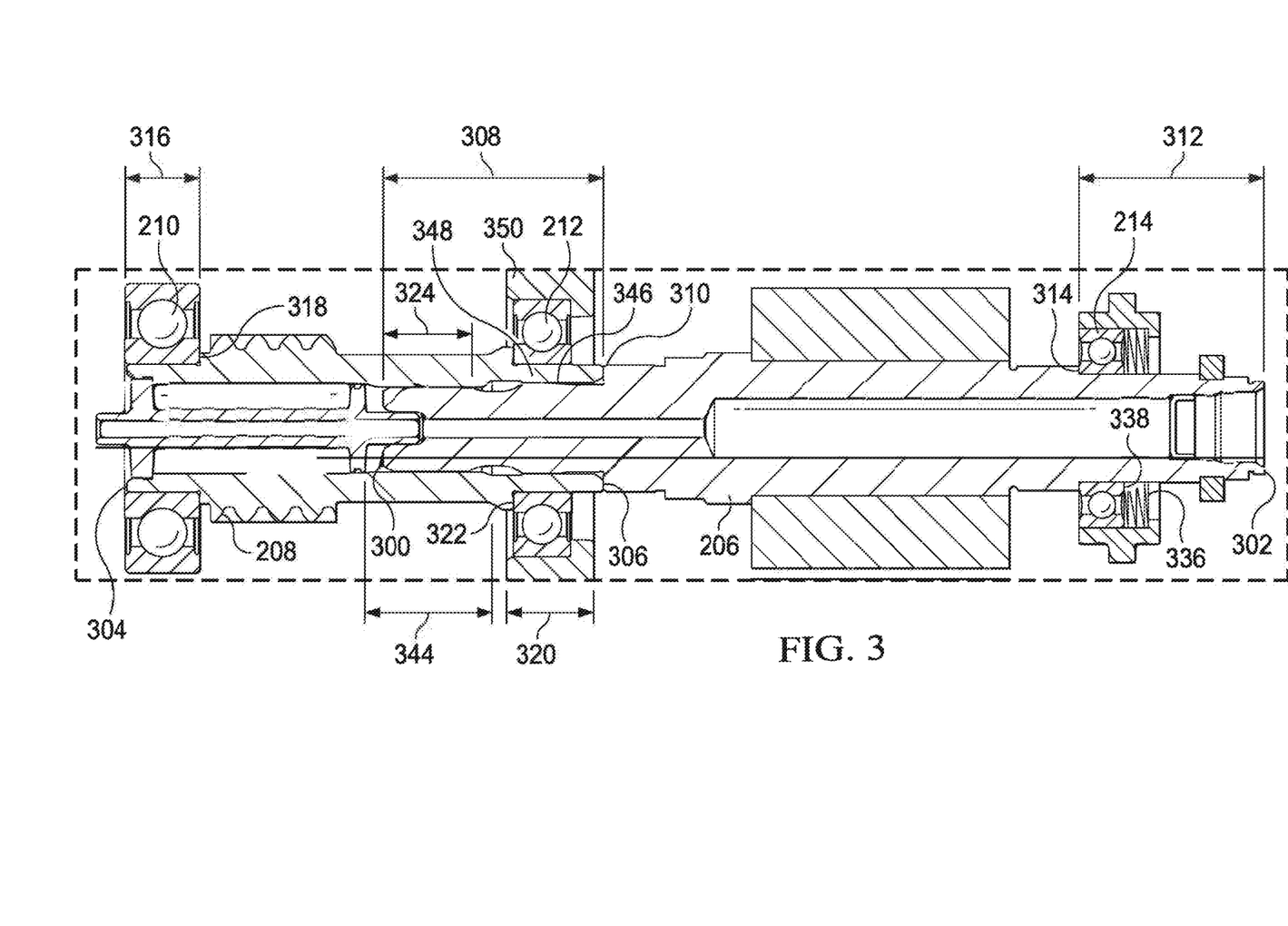
FIG. 3 illustrates a side sectional view of a portion of an electric drive unit according to a disclosed embodiment.

FIG. 3 illustrates a side sectional view of a portion of an electric drive unit according to a disclosed embodiment. More specifically, FIG. 3 shows rotor shaft 206 having first end 300 and second end 302, and gear shaft 208 having third end 304 and fourth end 306, where first end 300 of rotor shaft 206 is inserted into an opening defined in end 306 of gear shaft 208. Even more specifically, rotor shaft 206 defines first region 308 between first end 300 and first shoulder 310, which first region 308 is inserted into gear shaft 208 such that fourth end 306 of gear shaft 208 is adjacent first shoulder 310. Rotor shaft 206 further defines second region 312 between second end 302 and second shoulder 314. Similarly, gear shaft 208 defines third region 316 between third end 304 and third shoulder 318, and fourth region 320 between fourth end 306 and fourth shoulder 322.

In contrast to the arrangement of FIG. 1B, FIG. 3 shows rotor shaft 206, and gear shaft 208, being supported by only three bearings: bearing 210, bearing 212 and bearing 214. More specifically, first bearing 214 supports rotor shaft 206 in second region 312 adjacent second shoulder 314, and second bearing 210 supports gear shaft 208 in third region 316 adjacent third shoulder 318. Instead of having two bearings in between bearings 210 and 214, however, only third bearing 212 is used. According to a disclosed embodiment this is achieved by having third bearing 212 support gear shaft 208 in fourth region 320, adjacent fourth shoulder 322. Gear shaft 208 in turn supports rotor shaft 206 by first region 308, of rotor shaft 206, being disposed within gear shaft 208 as shown. As such, only first bearing 214 is in direct contact with rotor shaft 206, and only near one end thereof.

Also shown in FIG. 3 is first spline connector 324 defined by rotor shaft 206 within first region 308. Similarly gear shaft 208, defines a second spline connector 344 that mates with first spline connector 324. Together the individual spline connectors form a spline connection. Rotor shaft 206 further defines pilot journal 346 in first region 308, which mates with pilot bore 348 of gear shaft 208, to further support rotor shaft 206. According to a disclosed embodiment, bearing 210, bearing 212 and bearing 214 are deep groove ball bearings.

One benefit of the arrangement of FIG. 3 is that removing a bearing reduces the cost and mass of the system. Such an arrangement may also reduce efficiency losses which would otherwise be associated with misalignment of the individual bearing sets of the rotor shaft and gear shaft respectively. In addition, this arrangement also makes installation easier and removes mechanical system over-constraints associated with having individual bearing sets and a self-centering spline between the rotor shaft and gear shaft. For example, as shown in FIG. 3, structure 350 for maintaining bearing 212 in place is smaller than structure 114 shown in FIG. 1B to maintain bearings 102 and 110 in place.

FIG. 3 also shows wave spring 336 adjacent bearing 214 and on an opposite side 338 thereof from second shoulder 314. Wave spring 336 allows for consistent axial preloading of rotor bearing 214 across a range of axial work heights which reduces bearing noise and vibration, and improves durability. Further, wave spring 336 accommodates axial tolerance stackup variation by having a low spring rate, a consistent spring force and a small axial packaging space.

Figure 4A:
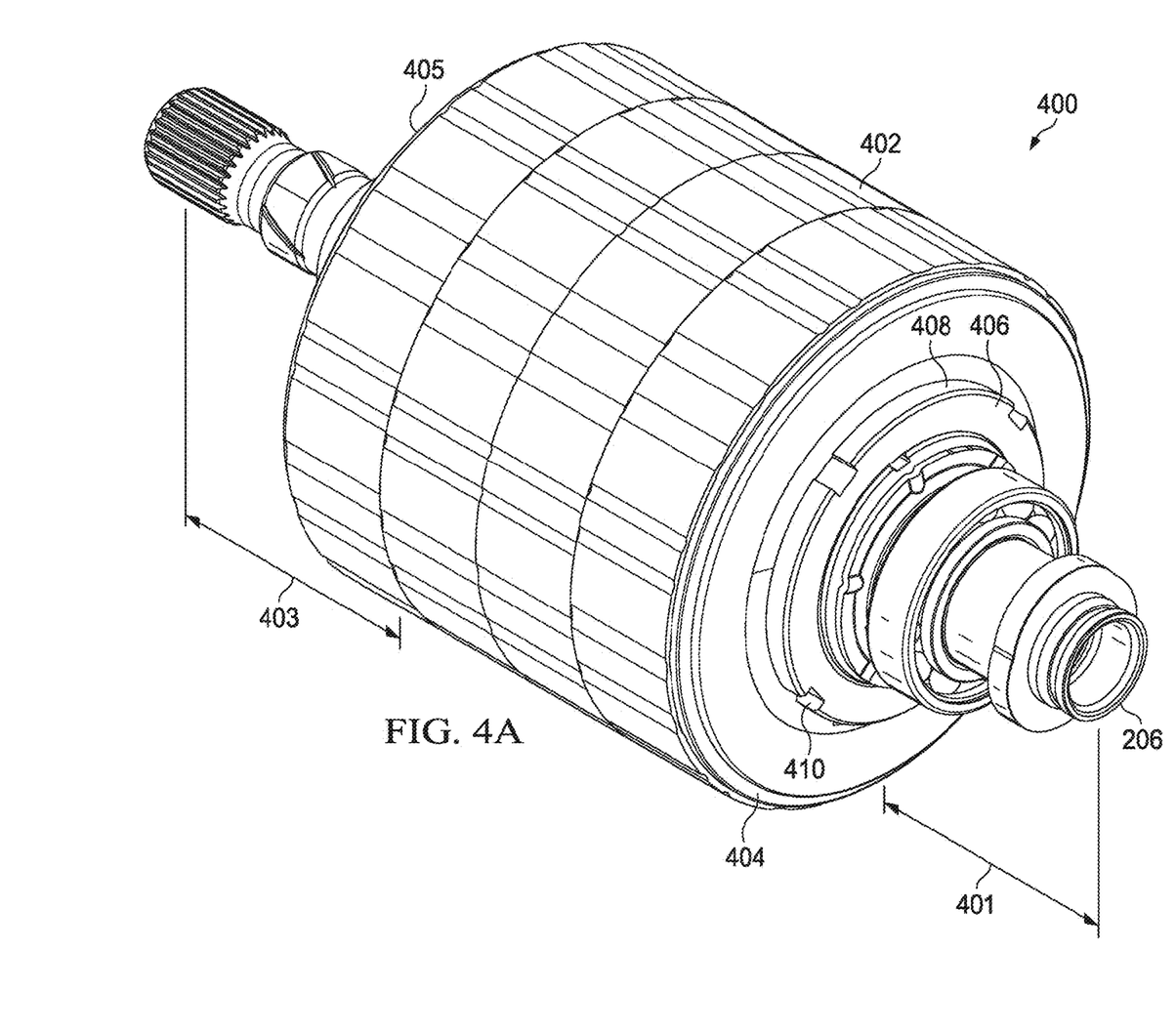
FIGS. 4A and 4B show perspective end views, and FIG. 4C a side sectional view, of a rotor according to a disclosed embodiment.
Figure 4B:
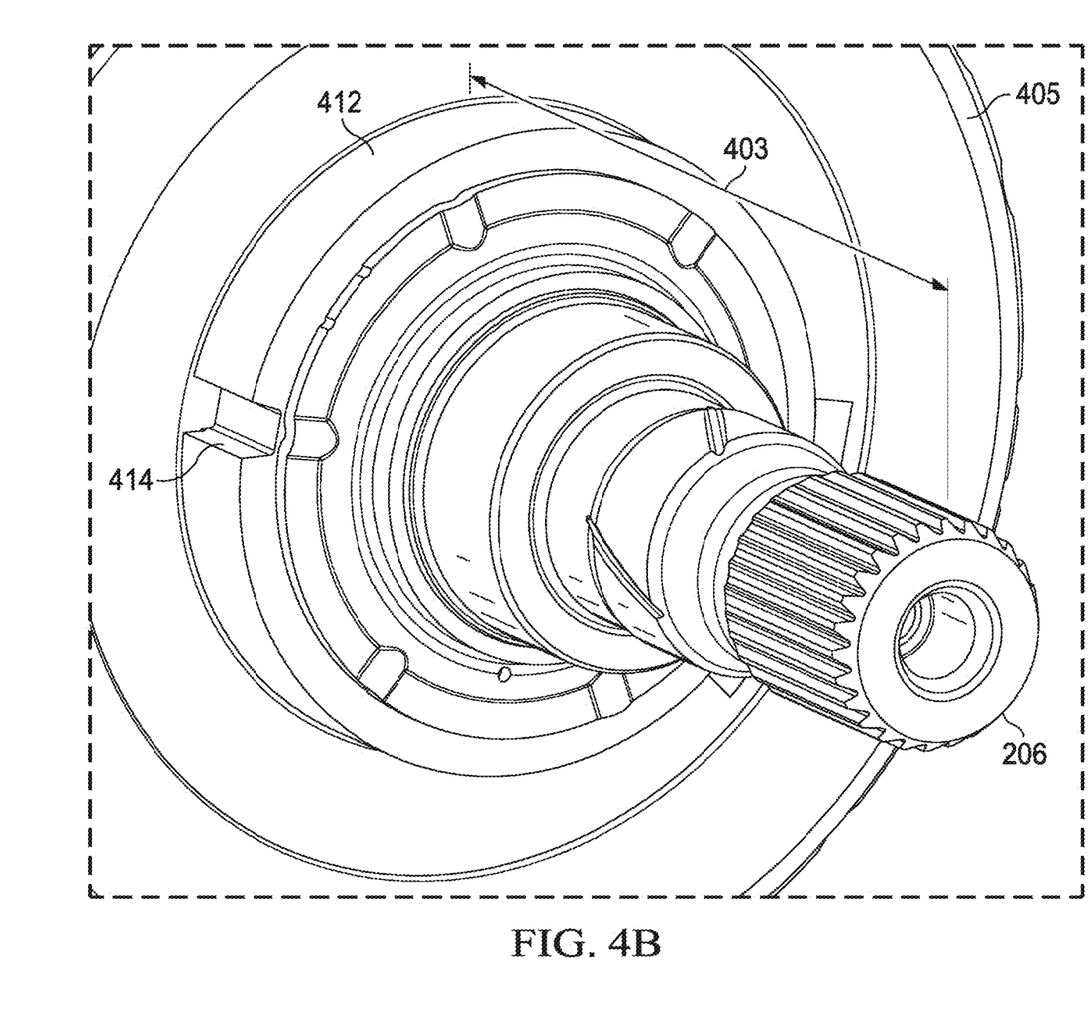
Figure 4C:
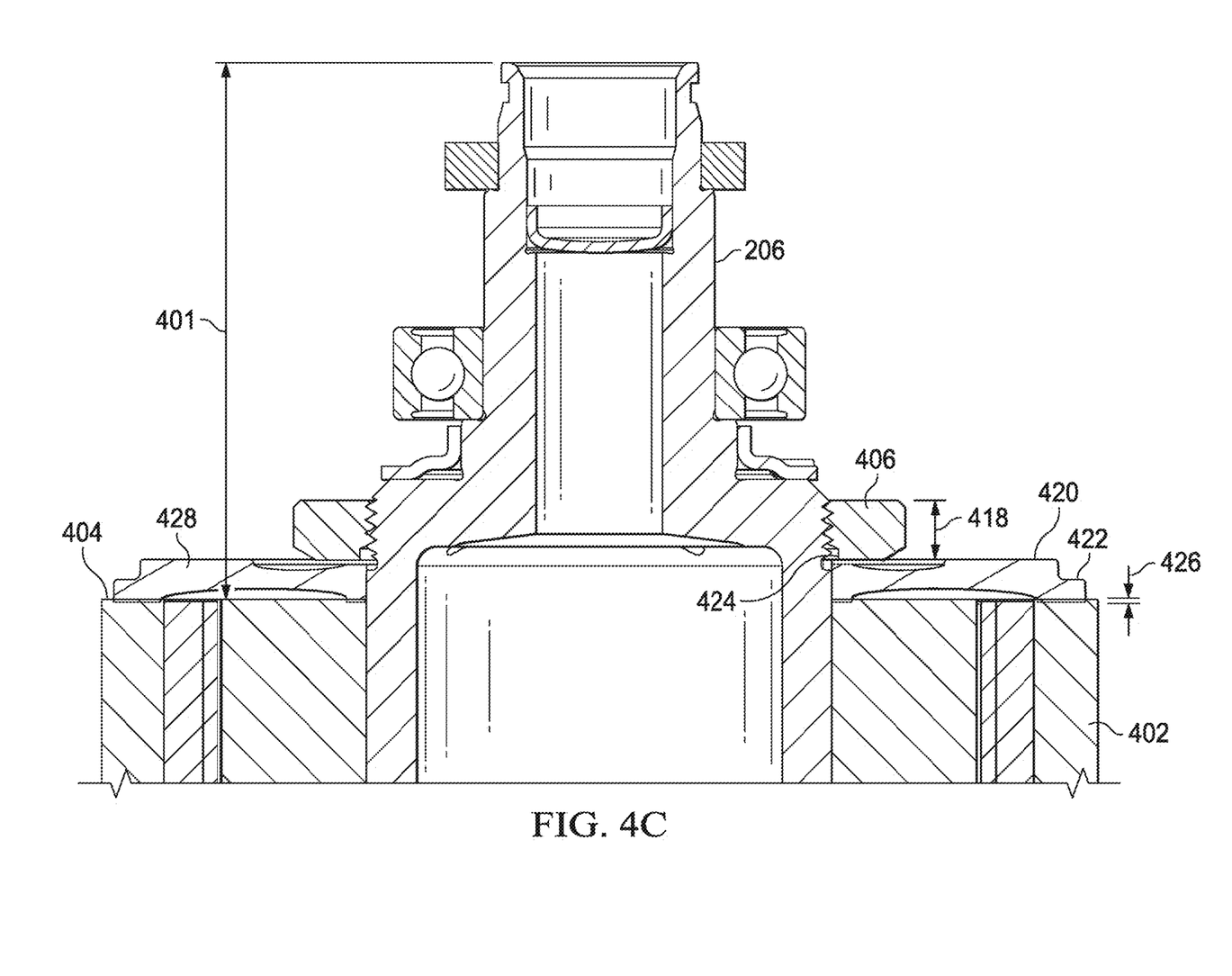

FIGS. 4A and 4B show perspective end views, and FIG. 4C a side sectional view, of a rotor according to a disclosed embodiment. Specifically, FIG. 4A shows rotor 400, including rotor shaft 206, positioned within stack of laminated discs 402 via openings defined therethrough (which openings are not shown). Rotor shaft 206 may be connected to laminated discs 402 via an interference fit and such that a first portion 401 of the rotor shaft extends beyond laminated discs 402 from rotor end 404, and such that a second portion 403 extends beyond laminated discs 402 from rotor end 405. Also shown in FIG. 4A is lock nut 406 which further secures rotor shaft 206 to laminated discs 402. According to a disclosed embodiment, lock nut 406 includes channels defined in an outer edge 408 thereof for tightening lock nut 406. One of such channels is labelled in FIG. 4A with reference number 410. In the example shown there are four channels, though only three are visible.

FIG. 4B shows rotor 400 looking toward rotor end 405. Visible from this perspective is shoulder 412 of second portion 403 of rotor shaft 206. In this embodiment shoulder 412 has two channels defined therein, one of which is labelled 414. These channels function as torque reaction features that can be engaged by an assembly robot when tightening lock nut 406 to rotor 400, so as to avoid having to engage with the spline connector, journal or other portion of rotor shaft 206 extending beyond rotor end 405. Though only two such channels are shown, more could be used.

FIG. 4C shows shaft portion 401, of rotor shaft 206, extending beyond rotor end 404. Also shown is threaded region 418 of first portion 401. Threaded onto threaded region 418 is lock nut 406 such that balancing ring 420 is interposed between lock nut 406 and laminated discs 402. According to a disclosed embodiment, balancing ring 420 retains preload with temperature variation. Lock nut 406 retains laminated discs 402 axially on the rotor shaft during operating conditions and, as a result of being threaded, allows for tolerance stack-up compensation of all involved components. A small axial offset in balancing ring 420 at outside diameter 422 relative to inside diameter 424 also causes balance ring 420 to act as a Belleville type spring when loaded against the lock nut and rotor end 404, thereby evenly loading the outside diameter of the lamination stacks for added rigidity. Though shown as interference 426 in FIG. 4C, a person of skill in the art will appreciate that this translates into an axial force being applied to the outside diameter of laminated discs 402.

After placing balancing ring 420 over rotor shaft 206 and securing with lock nut 406 using channels 410 and 414, a portion of the balancing ring can be removed via machining from material removal area 428. One purpose of balancing ring 420 is to provide sufficient material such that part be removed to allow for corrective rotor balancing while still maintaining its structural integrity so that along with lock nut 406, balancing ring 420 can retain laminated discs axially on rotor shaft 206 during operation of rotor 400.

Collectively, the above approaches present improvements over other preload mechanisms in that balancing ring 420 provides superior load characteristics via a single part, and allows for simplified low-risk assembly (no stacking required).

Figure 5:
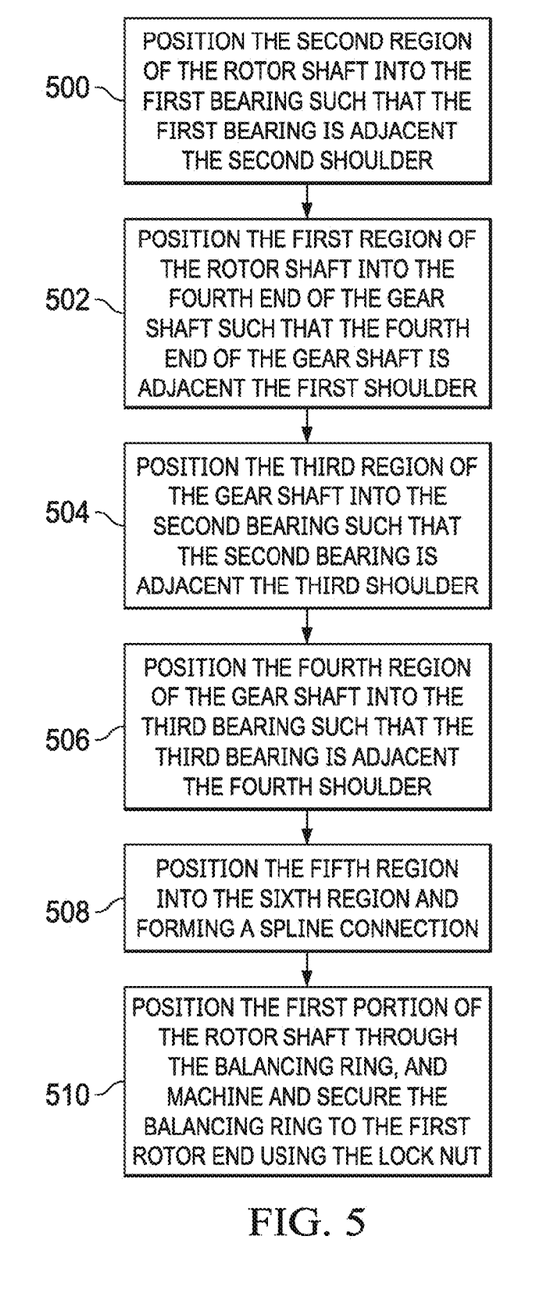
FIG. 5 illustrates a method of assembling an electric drive unit according to a disclosed embodiment.

FIG. 5 shows a method of assembling an electric drive, which method can be used to assemble structure and apparatus disclosed above with respect to FIGS. 1-4. Specifically, a first step 500 is to position the second region of the rotor shaft into the first bearing such that the first bearing is adjacent the second shoulder. A second step 502 is to position the first region of the rotor shaft into the fourth end of the gear shaft such that the fourth end of the gear shaft is adjacent the first shoulder. A third step 504 is to position the third region of the gear shaft into the second bearing such that the second bearing is adjacent the third shoulder. A fourth step 506 is to position the fourth region of the gear shaft into the third bearing such that the third bearing is adjacent the fourth shoulder. An optional fifth step 508 is to position the fifth region into the sixth region and form a spline connection. An optional sixth step 510 is to position the first portion of the rotor shaft through the balancing ring, and machine and secure the balancing ring to the first rotor end using the lock nut.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An electric drive unit having only three bearings in a rotor shaft and gear shaft portion of the electric drive unit, the electric drive unit comprising:
   a rotor shaft having a first end, a second end, and a first region of the rotor shaft extending from the first end to a first shoulder;
   a gear shaft having a third end and a fourth end;
   a first bearing supporting the rotor shaft near the second end;
   a second bearing supporting the gear shaft at the third end; and
   a third bearing supporting the gear shaft at the fourth end;
   wherein:
   the first region of the rotor shaft resides within the fourth end of the gear shaft;
   the fourth end of the gear shaft resides adjacent the first shoulder;
   the third bearing supports the rotor shaft; and
   the rotor shaft and gear shaft portion comprises only three bearings, wherein
   the rotor shaft has a second region of the rotor shaft extending from the second end to a second shoulder;
   the gear shaft has a third region of the gear shaft extending from the third end to a third shoulder, and a fourth region of the gear shaft extending from the fourth end to a fourth shoulder;
   the first bearing supports the rotor shaft in the second region adjacent the second shoulder;
   the second bearing supports the third region of the gear shaft and resides adjacent the third shoulder; and
   the third bearing supports the fourth region of the gear shaft and resides adjacent the fourth shoulder.

2. The electric drive unit of claim 1, additionally comprising:
   a first spline connector within the first region of the rotor shaft; and
   a second spline connector within a fifth region of the rotor shaft, wherein the fifth region resides within the third end to the fourth shoulder, and
   wherein the rotor shaft interfaces with the gear shaft via a spline connection of the second spline connector with the first spline connector.

3. The electric drive unit of claim 1, wherein the third bearing supports the rotor shaft in the fourth region.

4. The electric drive unit of claim 1, wherein the rotor shaft includes a pilot journal in the first region, wherein the gear shaft includes a pilot bore in the fourth region and wherein the pilot journal and pilot bore bear against each other.

5. The electric drive unit of claim 1, wherein the gear shaft further includes a gear.

6. The electric drive unit of claim 1, further comprising a wave spring adjacent to the first bearing and on an opposite side of the first bearing from the second shoulder.

7. The electric drive unit of claim 1, wherein only the first bearing is in direct contact with the rotor shaft, wherein the contact is near the second end in the second region.

8. An electric drive unit having only three bearings in a rotor shaft and gear shaft portion of the electric drive unit, the electric drive unit comprising:
   a rotor shaft having a first end, a second end, and a first region of the rotor shaft extending from the first end to a first shoulder;
   a gear shaft having a third end and a fourth end;
   a first bearing supporting the rotor shaft near the second end;
   a second bearing supporting the gear shaft at the third end; and
   a third bearing supporting the gear shaft at the fourth end;
   wherein:
   the first region of the rotor shaft resides within the fourth end of the gear shaft;
   the fourth end of the gear shaft resides adjacent the first shoulder;
   the third bearing supports the rotor shaft;
   the rotor shaft and gear shaft portion comprises only three bearings;
   a balancing ring and a lock nut,
   wherein a first portion of the rotor shaft extends outward from a first rotor end,
   wherein the first portion of the rotor shaft is positioned through the balancing ring such that the first rotor end is adjacent to the balancing ring; and
   wherein the balancing ring is secured to the first rotor end using the lock nut.

9. The electric drive unit of claim 8, wherein the lock nut comprises a plurality of channels in an outer edge of the lock nut.

10. The electric drive unit of claim 8, wherein the balancing ring is machined to balance the rotor.

11. The electric drive unit of claim 8, wherein the balancing ring is interposed between the lock nut and first rotor end.

12. The electric drive unit of claim 8, wherein the first portion of the rotor shaft comprises a threaded region, and wherein the lock nut is secured to the rotor shaft via the threaded region.

13. The electric drive unit of claim 8, wherein the balancing ring functions as a Belleville-type spring when loaded against the lock nut and the first rotor end.

14. The electric drive unit of claim 8, additionally comprising a stack of laminated discs determining the first rotor end and an opposite second rotor end, and wherein the stack of laminated discs has an opening therethrough.

15. The electric drive unit of claim 14, wherein the rotor shaft extends through the opening and is connected to the stack of laminated discs.

16. The electric drive unit of claim 14, wherein the rotor shaft is connected to the stack of laminated discs with an interference fit.

17. The electric drive unit of claim 14, wherein the first portion of the rotor shaft extends outward beyond the stack of laminated discs and wherein a second portion of the rotor shaft extends outward from the second rotor end beyond the stack of laminated discs.

18. The electric drive unit of claim 17, wherein the second portion of the rotor shaft comprises a shoulder having a plurality of channels in an outer edge of the shoulder.

19. The electric drive unit of claim 18, wherein the plurality of channels in the outer edge of the shoulder of the second portion of the rotor shaft are torque reaction features configured to avoid engagement of a first spline connector and a second spline connector.

* * * * *